United States Patent
Goto et al.

(10) Patent No.: US 6,705,637 B1
(45) Date of Patent: Mar. 16, 2004

(54) INFLATOR

(75) Inventors: Yuzo Goto, Hyogo (JP); Satoshi Yagi, Hyogo (JP); Masayuki Yamazaki, Hyogo (JP); Eiichi Ryobo, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 50 days.

(21) Appl. No.: 10/110,328

(22) PCT Filed: Oct. 27, 2000

(86) PCT No.: PCT/JP00/07581
§ 371 (c)(1),
(2), (4) Date: Apr. 11, 2002

(30) Foreign Application Priority Data

Oct. 28, 1999 (JP) .............................................. 11-307157
Oct. 26, 2000 (JP) ..................................... 2000-326612

(51) Int. Cl.⁷ .............................................. B60R 21/26
(52) U.S. Cl. ..................................... 280/728.2; 280/737
(58) Field of Search .............................. 280/728.2, 736, 280/737, 740, 741

(56) References Cited

U.S. PATENT DOCUMENTS

| | | | | |
|---|---|---|---|---|
| 4,153,273 A | * | 5/1979 | Risko | 280/728.2 |
| 5,615,912 A | * | 4/1997 | O'Loughlin et al. | 280/737 |
| 5,660,412 A | * | 8/1997 | Renfroe et al. | 280/737 |
| 5,711,546 A | * | 1/1998 | Hamilton et al. | 280/736 |
| 5,785,348 A | | 7/1998 | Donovan et al. | |
| 5,924,728 A | * | 7/1999 | Evans et al. | 280/741 |

FOREIGN PATENT DOCUMENTS

| | | |
|---|---|---|
| EP | 0 673 809 A1 | 9/1995 |
| EP | 0 791 512 A1 | 8/1997 |
| JP | 5-24460 U | 3/1993 |
| JP | 6-6128 U | 1/1994 |
| JP | 3018705 U | 9/1995 |
| JP | 8-282427 A | 10/1996 |
| JP | 9-226505 A | 9/1997 |
| JP | 9-315259 A | 12/1997 |

\* cited by examiner

*Primary Examiner*—Peter C. English
(74) *Attorney, Agent, or Firm*—Birch, Stewart, Kolasch & Birch, LLP

(57) ABSTRACT

An inflator comprises a cylindrical inflator housing elongated in an axial direction and containing a gas generating material for inflating an air bag, and an activation assembly for generating an activation gas for activating the gas generating material. A cylindrical diffuser assembly is provided in an axial end of the inflator housing. The diffuser assembly has an end surface, and also has a plurality of outlet holes in a peripheral wall surface thereof. A through-hole is formed in the end surface of the diffuser assembly, and a stud bolt for fixing the inflator is inserted into the through-hole. The stud bolt is fixed by a flange portion provided on an end portion thereof.

17 Claims, 4 Drawing Sheets

INFLATOR

This application is the national phase under 35 U.S.C. § 371 of PCT International Application No. PCT/JP00/07581 which has an International filing date of Oct. 27, 2000, which designated the United States of America.

FIELD OF THE INVENTION

The present invention relates to an inflator for a safety system used in a motor vehicle or the like, and more specifically to an improvement in a hybrid inflator.

BACKGROUND OF THE INVENTION

With the development of an inflator for an inflating-type safety system of a motor vehicle, a hybrid inflator using both a pressurized gas and a solid gas generating agent is attracting attention. A main design requirement for a hybrid inflator is that the inflator inflates an air bag by a predetermined amount in a predetermined time so that the air bag is effectively activated. Various proposals concerning a structure to meet the requirement have heretofore been made (for example, as referred in JP-A No. 8-282427).

Since such a hybrid inflator has generally a complicated internal structure, it is necessary to manufacture the inflator with a sufficient care in order to enhance reliability and it is necessary to mount the inflator to a vehicle securely in order to activate the inflator without fail. Particularly in a hybrid inflator, since there are a relatively large number of parts and a robust housing is required for accommodating a pressurized gas, the inflator itself becomes relatively heavy, and there is a room for improvement in mounting easiness to a vehicle. Also, since hybrid inflators are mounted to various vehicles such as automobiles or the like, it is necessary to maintain intended activation performances thereof regardless of vibrations from the vehicles even after mounted.

Furthermore, in order to improve mounting easiness to various vehicles, preferably, the entire weight and size of an inflator are suppressed and such a structure that the inflator can be mounted to a vehicle easily and securely is employed.

SUMMARY OF THE INVENTION

The present invention is made in order to solve the above problem, and an object thereof is to provide an inflator having a structure such that it can be mounted to an air bag module more easily and securely than a conventional inflator, and that can be manufactured simply and is improved in reliability at the time of activation.

According to the present invention, an inflator, which is a device for inflating an air bag of a vehicle, can be prevented from being dislocated and can be mounted on a vehicle securely is provided.

That is, the present invention provides an inflator comprising, in a cylindrical inflator housing elongated in an axial direction and containing a gas generating material for inflating an air bag and an activation assembly for generating an activation gas to activate the gas generating material, and provided, in an axial end of the inflator housing, with a diffuser assembly which is cylindrical in shape with an end and has a plurality of outlet holes in a peripheral wall surface thereof. A through-hole is formed in the end surface of the diffuser assembly, a stud bolt for fixing the inflator is inserted into the through-hole and the stud bolt is fixed by a flange portion provided on an end portion thereof.

The diffuser assembly may be formed in such a manner that the end surface thereof is provided with the through-hole after a cylinder with an end is formed, or alternatively, in such a manner that one end opening (in other words, an opening in the end surface side) of a substantially cylindrical in shape is crimped inwardly to have a flange-shaped shape.

The stud bolt can be fixed by a flange portion provided at its end portion. For example, the flange portion of the stud bolt may be welded to the inside of the end surface of the diffuser assembly, or a supporting portion projecting inwardly in the radial direction can be formed on an inner peripheral surface of the diffuser assembly so that the flange portion of the stud bolt can be held between the supporting portion and an end surface of the diffuser assembly. Particularly, the latter case is suitable for a case such that the end surface is formed by crimping an end opening of the diffuser assembly positioned in the side where the stud bolt is supported. The supporting portion has to be formed at least to support the rear end of a flange portion in the stud bolt. For example, the supporting member may be formed in such a manner that a projection is formed at a arbitrary position circumferentially in the inner peripheral surface of the diffuser assembly, or alternatively, in such a manner that the inner peripheral surface of the diffuser assembly is circumferentially step-notched. Naturally, the supporting portion may be also formed in such a manner that the inner peripheral surface of the cylindrical diffuser assembly is hollowed circumferentially from an end portion in the predetermined width and then, the inner peripheral surface of the cylindrical diffuser assembly is provided with a bump.

Further, when the stud bolt is fixed by a method other than a welding, it is preferable that rotation between the stud bolt and the diffuser assembly is prevented. For this purpose, desirably, a rotation-preventing structure for preventing circumferential rotation such as a notched structure formed in the radial direction is provided on the flange portion of the stud bolt.

Generally, the inflator is accommodated in the module case together with an air bag for introducing an activated gas to inflate the air bag, and the module case is mounted to various vehicles. In case of the above inflator elongated in the axial direction, the inflator and the module case are fixed to each other by the stud bolt provided at an end surface of the inflator or the like, and the stud bolt is welded to the diffuser assembly provided on an end surface of the inflator housing from the outside. In the present invention, the flange portion is provided on an end portion of the stud bolt (in other words, a rear end portion existing inside the diffuser assembly after mounted), the through-hole is provided in the end surface of the diffuser assembly and the stud bolt is inserted from the inside of the through-hole. With this structure, the flange portion formed in the rear end portion of the stud bolt is abutted against and supported by the inner surface of the diffuser assembly. By arranging the stud bolt to the inflator in this manner, connection between the stud bolt and the inflator can be maintained securely at the time of or after mounting the inflator to the module case with the stud bolt, and thereby, the inflator can be prevented from being dislocated from the module case.

The above inflator can be mounted to the module case in such a manner that the stud bolt is protruded from the module case and then, a nut is fastened to the protruded stud bolt. In this case, it is preferable to provide a rotation-preventing means at the time of assembling the inflator since, without any rotation-preventing means of the inflator, the inflator starts rotating inside the module case by fastening the nut and the assembling process is disturbed. Such a rotation-preventing means can be obtained, for example, in such a manner that a flat surface is formed by notching the predetermined part in the peripheral surface of the stud bolt, a hole of the module case which the stud bolt passes through is formed to meet the flat surface of the stud bolt and both are combined with each other. In this case, the stud bolt has to be notched in the predetermined shape. Preferably, the rotation-preventing means is provided in the activation assembly side of the inflator, more particularly, on the peripheral edge of a boss member which closes one end of the inflator housing and stores an electrical ignition type igniter to be activated by the activation signal.

In other words, the diffuser assembly, which is cylindrical in shape with a bottom and has a plurality of outlet holes in the peripheral wall surface, is arranged on the one axial end portion of the inflator housing, and the boss member, which stores an initiator for activating the inflator, is arranged on the other end portion. Further, the stud bolt for mounting the air bag module is provided in the diffuser assembly. In the boss member, the peripheral edge is formed like a flange protruding in the radial direction of the housing. The rotation-preventing means, which is required at the time of mounting the inflator to the air bag module, is provided on the above peripheral edge. An example of the rotation-preventing means is a protruding portion formed on the flange-shaped peripheral edge and projecting partially outward in the radial direction. If the rotation-preventing means for mounting the inflator is provided to the boss member in this manner, the stud bolt is not required to be cut and a stud bolt which has a substantially circular section can be used. With this, the manufacturing cost can be reduced and the manufacturing can be facilitated. Still, when the protruding portion (rotation-preventing means) which projects convexly in part and outwardly in the radial direction is formed in the flange-shaped peripheral edge, the number of the protruding portion may be one or more.

The present invention described above can be specified in the following inflator.

Namely, an inflator has an inflator housing containing a pressurized medium charged therein, a gas generator which comprises the gas generator housing in communication with the inflator housing and a propellant arranged inside the gas generator housing, an outlet passage which makes either space inside the inflator housing or gas generator communicate with the diffuser assembly, a first closing disk sealing the outlet passage, a projectile arranged and adjusted for the first closing disk and a combustion-product forming means which forms a combustion product for igniting the propellant. The projectile is propelled to pass through at least partially the first closing disk by using the combustion-product forming means, and the outlet passage is arranged inside the inflator housing to extend, passing through one end of the inflator housing and is at least partially arranged and adjusted for the gas generator housing. Also in the inflator, the stud bolt is inserted from the inside of the diffuser assembly to be supported and fixed, thereby preventing the inflator from being dislocated out of the module case.

When an inflator according to the present invention is used in a pad module for an air bag apparatus comprising the inflator, an air bag which introduces a gas generated due to activation of the inflator therein to inflate the air bag, and a module case which accommodates the inflator and the air bag, the pad module prevents the inflator from being dislocated due to vibrations or the like.

Further, in the pad module for an air bag apparatus, when a rotation-preventing means, serving at a time of assembling of the inflator, is formed on a flange-shaped peripheral edge of the boss member in the inflator and/or an insertion portion for the inflator of the module case, is facilitated, manufacturing cost can be reduced.

That is, the inflator comprises a boss member closing one end opening of the inflator housing, a peripheral edge of the boss member is formed in a flange shape projecting and spreading in the radial direction of the inflator housing, and the flange shaped-peripheral edge is provided with a rotation-preventing means projecting outwardly in the radial direction. Meanwhile, in the module case, an opening portion for inserting the inflator into the inner space is formed and a supporting portion for abutting/supporting the rotation-preventing means is provided on a peripheral edge of the opening portion, thereby forming a pad module for an air bag apparatus in which the rotation-preventing means is supported by the supporting portion.

According to the present invention, damages to the connection structures of the inside and outside of inflator or the like can be prevented, and reliability at the time of activation of the inflator can be improved. Also, reliability at the time of mounting to a vehicle and an assembling easiness can be enhanced.

Furthermore, the entire weight and size of the inflator itself can be suppressed by reducing the number of constituent parts, and the inflator is advantageous in terms of cost by enhancing a manufacturing efficiency.

BRIEF DESCRIPTION OF THE DRAWINGS

FIGS. 4(a) and (b) show an alternative connection of the diffuser assembly and a stud bolt, wherein FIG. 4(a) is an exploded sectional view of the diffuser assembly and FIG. 4(b) is a sectional view of the diffuser assembly.

Detailed Description of the Invention

Figure 1:
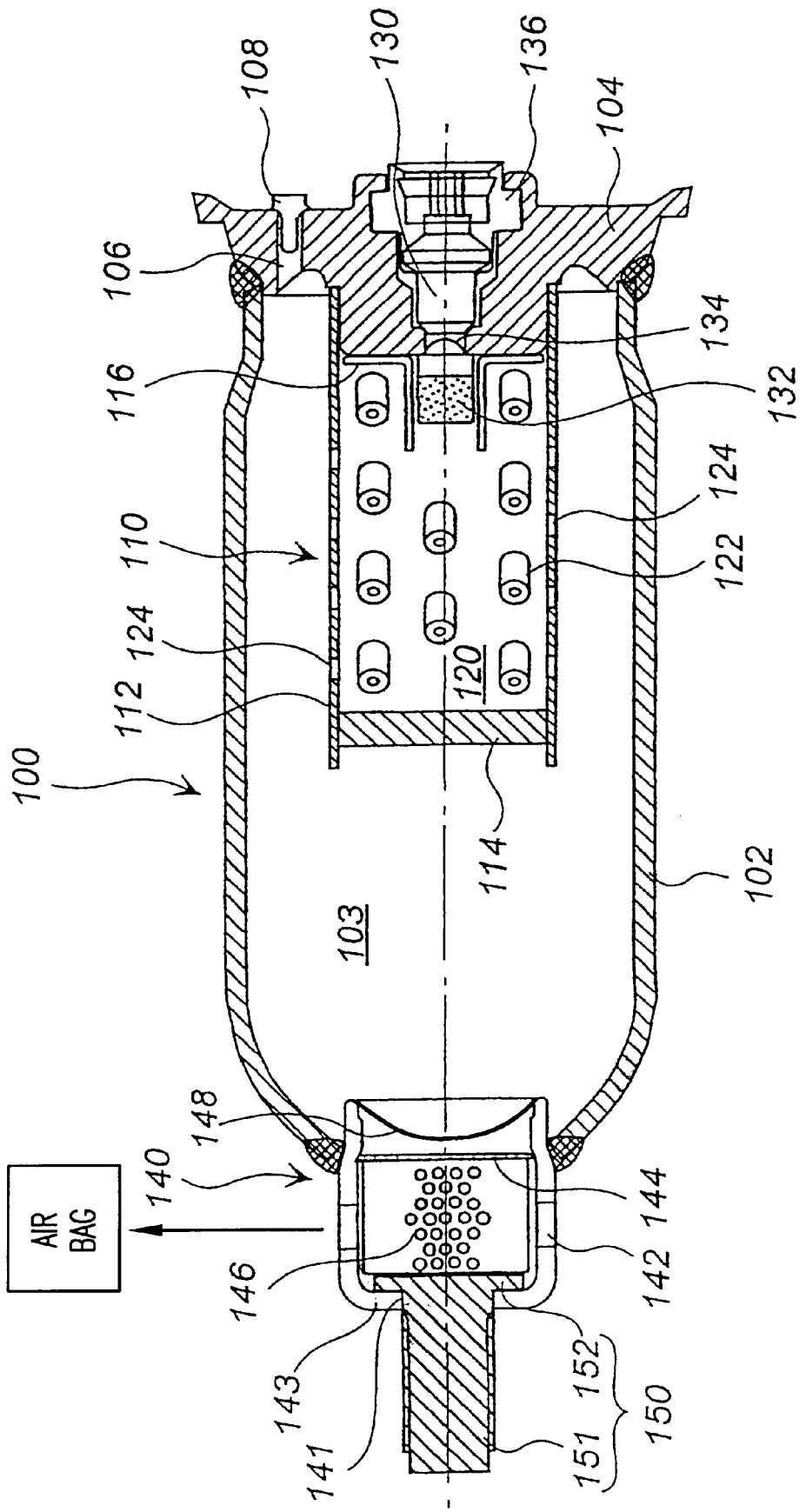
FIG. 1 is a vertical sectional view showing an inflator according to an embodiment of the present invention.

The present invention will be described below in detail with reference to the drawings showing an embodiment of the present invention. FIG. 1 is a vertical sectional view of an inflator in the longitudinal direction according to an embodiment of the present invention. An inflator 100 shown in FIG. 1 can suitably be used in a passenger side.

An inflator housing 102 comprises a cylindrical container made of a high tensile strength steel. A pressurized medium containing an inert gas (Ar, He, and $N_2$) or the like is charged in the inner space 103 of the inflator housing 102 at a required pressure. The pressurized medium is generally charged through a small hole 106 formed in a boss member 104 connected to one end (the right end in FIG. 1) of the inflator housing 102, and the small hole 106 is closed by a sealing pin 108 after the pressurized medium is charged. This pressurized medium is discharged from a gas discharging hole, after a main rupturable plate 148 is ruptured due to activation (ignition/combustion) of a gas generating material described below, to inflate an air bag together with a gas generated due to activation of the gas generating material.

Also, as an activation assembly (namely, an assembly for activating the inflator 100) for activating (igniting/burning) the gas generating material to generate a gas, a gas generator 110 is accommodated in the inflator housing. The gas generator is activated by an activation signal output from an activation-signal outputting device (not shown) provided outside the inflator housing 102 to activate (ignite/burn) the gas generating material. The gas generator 110 has a single gas generating chamber 120 defined by a cylindrical gas generator housing 112, a partition wall 114 for closing one end opening of the housing 112, and a retainer 116 which may also adjust an amount of the gas generating material. A required amount of gas generating agent 122 is charged in the gas generating chamber 120 as a gas generating material. An increase in an internal pressure due to a gas generated by combustion of the gas generating agent 122 and heat incurred to the pressurized medium provided inside the inner space 103 rupture the main rupturable plate 148, and the generated gas and the pressurized medium are discharged from a diffuser port (outlet hole) 142 of a diffuser assembly 140 to inflate the air bag. Such a gas generating agent may be formed, for example, by using fuel, an oxidizing agent, and the like. Also, a required number of communication holes 124 are formed in the gas generator housing 112. A filter or a screen made of a metal wire mesh or the like may be provided, if required, inside the gas generating chamber 120 at a portion where the communication holes 124 are formed. Since the pressurized medium flows into the gas generating chamber 120 via the communication holes 124, the gas generating chamber 120 is maintained at the same pressure as the inner space 103 of the inflator housing 102.

The gas generator 110 has igniting means, for initiating activation, disposed at one end (the right end in FIG. 1) of the inflator housing 102. The igniting means comprises an igniter 130 and a booster (a transfer charge) 132 filled in a booster cup and ignited and burnt by activation of the igniter. A rupturable plate 134 is provided between the igniter 130 and the booster 132. In the present embodiment, the igniter is arranged in the boss member 104, which closes the one end opening of the inflator housing. In FIG. 1, numeral 136 represents an initiator collar for attaching the igniter to the boss member 104.

Figure 2:
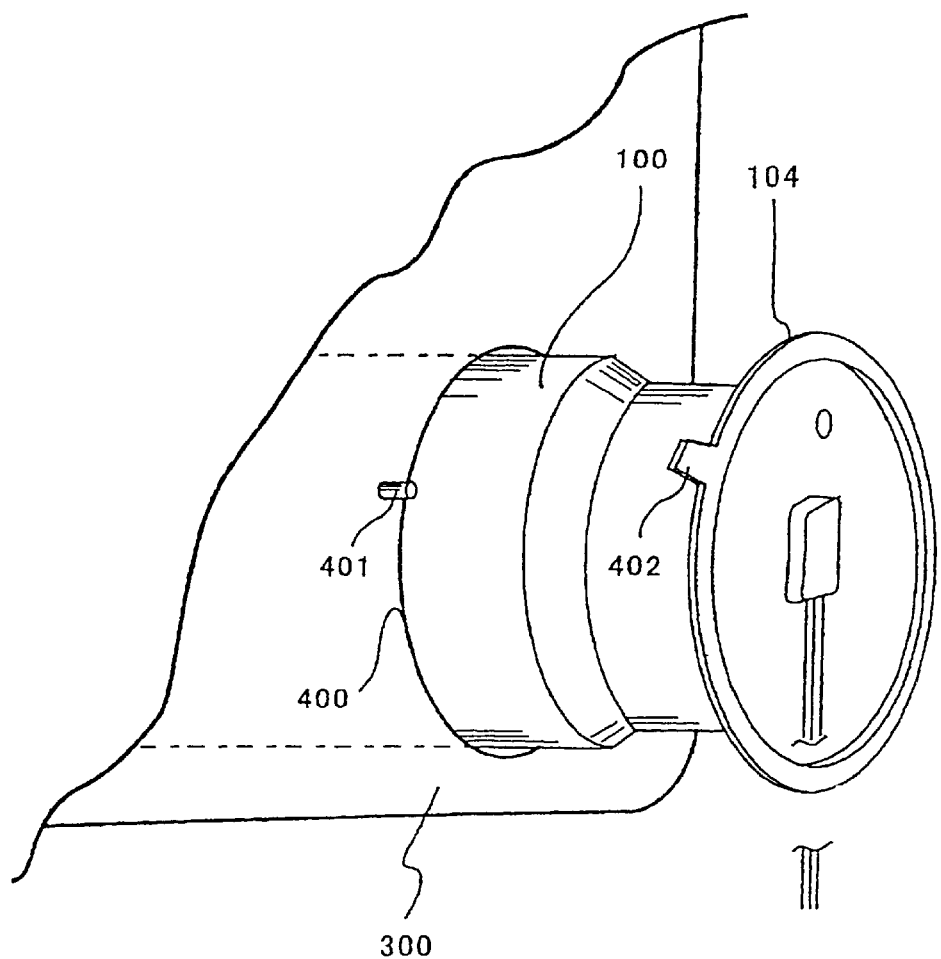
FIG. 2 is an exploded perspective view showing a rotation-preventing means of an initiator.
Figure 3:
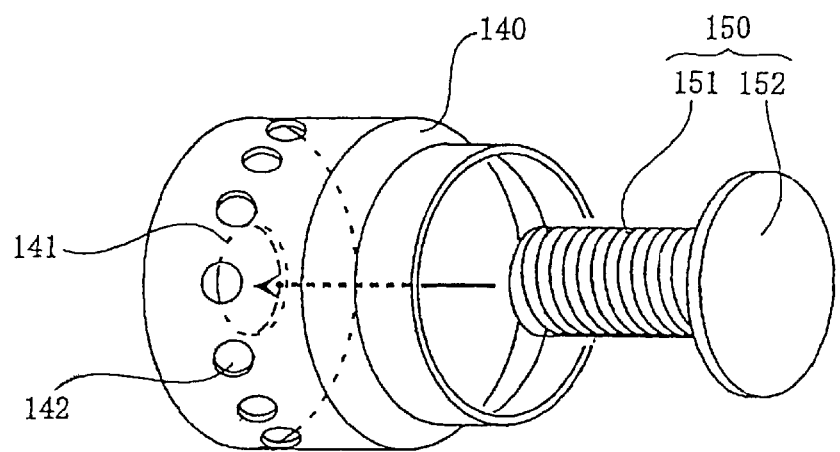
FIG. 3 is a sectional view of a diffuser assembly.

A peripheral edge of the boss member 104 protrudes and spreads like a flange from the inflator housing 102 in a radial direction, and rotation-preventing means, which is required at the time of mounting the inflator 100 to the air bag module, is provided on the peripheral edge of the boss member 104. In the present embodiment, a protruding portion 402 (refer to FIG. 2), which projects partially outward in the radial direction, is provided on the peripheral edge of the boss member 104 formed in a flange shape. The protruding portion 402 functions as the rotation-preventing means. As shown in FIG. 2, by inserting the inflator 100 into an inflator insertion opening portion 400 formed in the module case side, the protruding portion 402 is abutted against/supported by a supporting portion 401 projecting like a pin in the vicinity of the opening portion 400, so that rotation of the inflator 100 in a predetermined direction is prevented. By forming two members in this manner, the protruding portion 402 is abutted against/supported by the supporting portion 401 when a nut (not shown) is fastened to a stud bolt 150 during mounting of the inflator 100 to the module case 300, so that rotation of the inflator 100 inside the module case 300 can be prevented. Accordingly, in this case, as the stud bolt 150, one which has a substantially circular section and whose peripheral surface is not cut off partially can be used. Incidentally, in the drawings, the protruding portion 402 and the supporting portion 401 are formed as one pair, but they may be formed as a plurality of pairs or the respective numbers of the protruding portion 402 and the supporting portion 401 to be formed may be different from each other such that two protruding portions 402 and one supporting portion 401 may be formed. In case that the numbers of the protruding portion 402 and the supporting portion 401 to be formed are different from each other, rotation of the inflator 100 can be prevented as long as the protruding portion 402 and the supporting portion are engaged in at least one combination with each other. Meanwhile, a diffuser assembly 140 is connected to the other end (the left end in FIG. 1) of the inflator housing 102. The diffuser assembly 140 has a cylindrical shape with an end, its peripheral wall are provided with a plurality of diffuser ports (outlet holes) 142 for introducing the pressurized medium into the air bag, and, further, the diffuser assembly includes therein diffuser screens 144 and 146 for removing fine particles. In the present invention, a through-hole 141, in which a stud bolt is inserted, is formed in an end surface 143 of the diffuser assembly 140. The stud bolt 150 is for mounting the inflator 100 to the module case (not shown), and it comprises a shaft portion 151 provided at its peripheral edge with a screw groove and a flange portion 152 formed at a rear end portion (right end in FIG. 1) of the shaft portion 151. In the stud bolt 150 formed in this manner, as shown in FIG. 3, the shaft portion 151 is inserted from the inside of the diffuser assembly 140 into the through-hole 141 formed in the bottom surface of the assembly 140. Thereby, the flange portion 152 of the stud bolt 150 is fixed to the inside of the diffuser assembly 140. That is, the stud bolt 150 and the diffuser assembly 140 are constantly kept connected to each other even when a welding between the protruding portion 402 and the supporting portion 401 is degraded, so that the inflator 100 can be prevented from falling off. Also, the main rupturable plate 148 is arranged in the inner space 103 side (i.e., in the opening side) of the inflator housing of the diffuser assembly 140. The inside of the inflator housing 102 is sealed off from the outside air by the main rupturable plate 148, and the pressurized medium filled inside the inflator housing 102 is maintained under a predetermined pressure.

Also, the connection of the diffuser assembly and the stud bolt can be performed by means shown in FIG. 4(*a*) which shows an exploded sectional view of a main portion, and FIG. 4(*b*) which shows sectional view of the main portion.

In other words, a supporting portion 200 projecting inwardly in the radial direction is formed on an inner peripheral surface of the cylindrical diffuser assembly 240, and a rear end of the flange portion 152 is supported by the supporting portion 200. Then, a bottom surface 243 of the diffuser assembly 240 is formed by crimping the opening end portion 201, which exists outside the housing 102 of the diffuser assembly 240, inwardly in a flange shape, and the flange portion 152 is held between the bottom surface 243 and the supporting portion 200. Thereby, the stud bolt 150 is securely fixed to the diffuser assembly and the shaft portion 151 penetrates the bottom surface 243 of the diffuser assembly such that it protrudes outwardly in the axial direction. Incidentally, the through-hole 241 formed in the bottom surface 243 is obtained by crimping the opening end portion 201 of the diffuser assembly 240.

The supporting portion 200 formed on an inner peripheral surface of the diffuser assembly may be formed by step-notching the inner peripheral surface of the diffuser assembly 240, or alternatively, by forming a convex portion projecting inwardly at an arbitrary portion in the circumferential direction. In the supporting portion 200 shown in FIGS. 4(*a*) and (*b*), the inner peripheral surface of the cylindrical diffuser assembly 240 is hollow from an end portion thereof to form an opening portion 201, and also, the inner peripheral surface of the cylindrical diffuser assembly is formed in a step-notched shape by providing a bump.

Figure 4A:
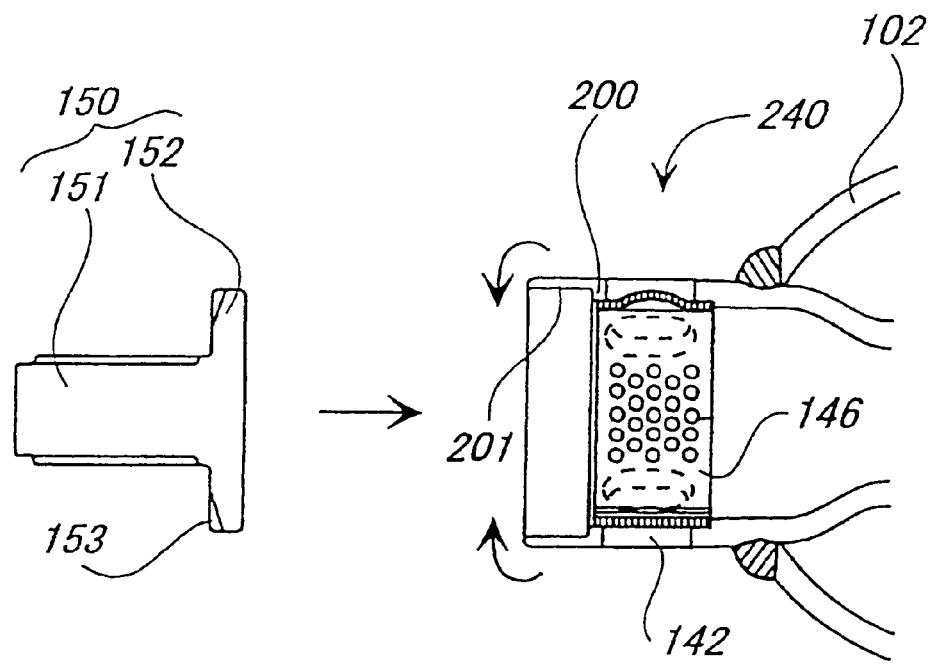
Figure 4B:
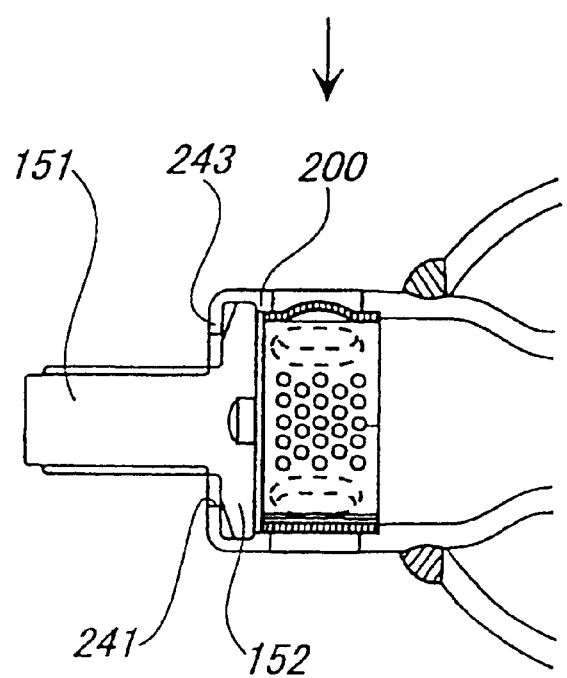

Then, as shown in FIGS. 4(a) and 4(b), when the flange portion 152 of the stud bolt is held between the bottom surface 243 and the supporting portion 200 of the diffuser assembly 240, it is desirable that rotation between the diffuser assembly 240 and the stud bolt 150 is blocked. For this purpose, desirably, a rotation-preventing structure such as a notched structure 153 or the like formed in the radial direction thereof is suitably provided in the flange portion 150 of the stud bolt, as shown in FIG. 5.

Figure 5:
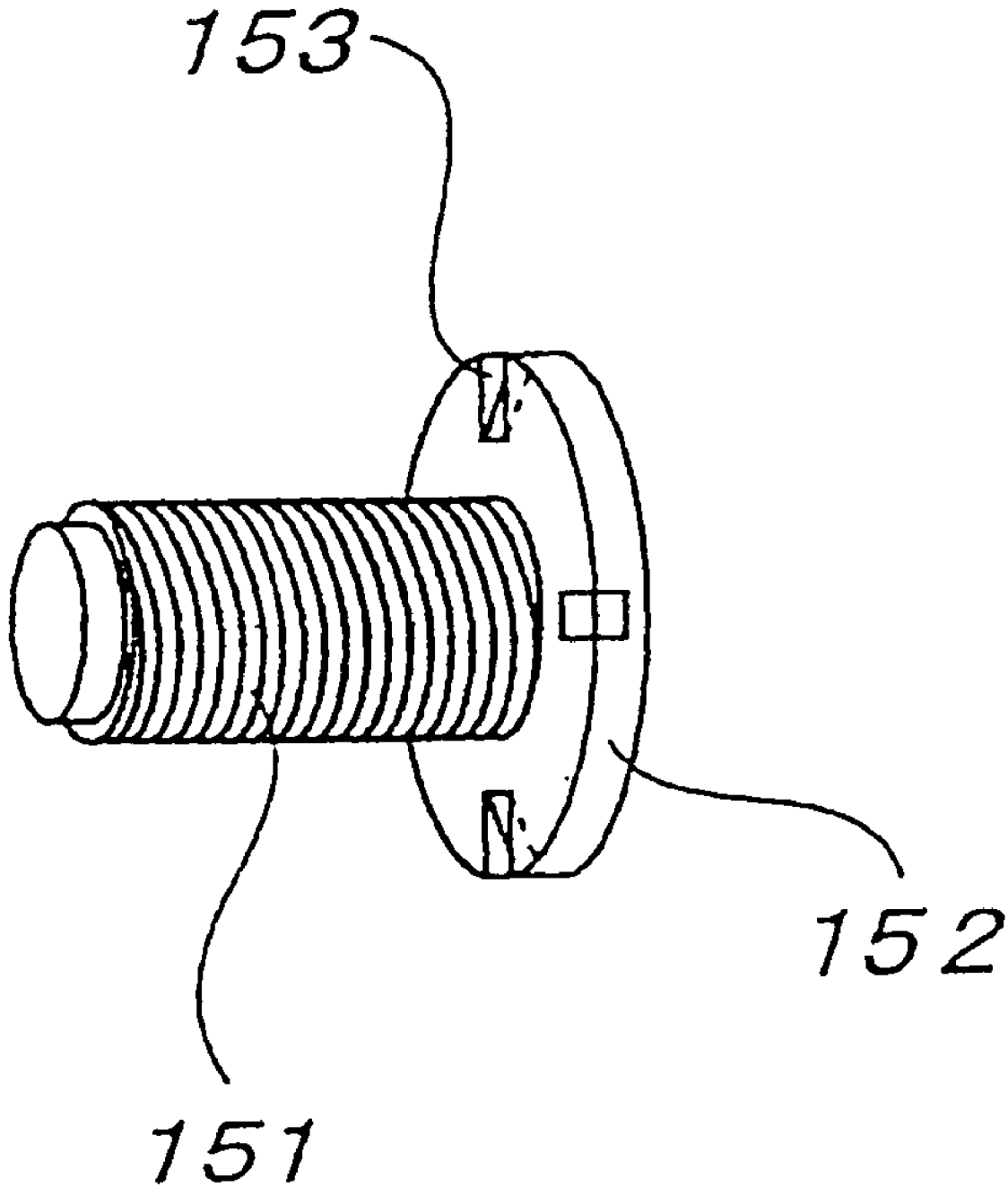
FIG. 5 is a perspective view showing the stud bolt shown in FIGS. 4(a) and 4(b).

Particularly, when the notched structure 153 formed in the radial direction is provided on the flange portion 152 as shown in FIG. 5, the bottom surface 243 is formed by crimping the opening end portion 201 of the diffuser assembly so that the bottom surface 243 is bent along the notched structure, thereby securing connection between the diffuser assembly 240 and the flange portion 152 of the stud bolt 150. Naturally, any structure or shape other than the aspect shown in FIG. 5 to prevent relative rotation between the diffuser assembly 240 and the stud bolt 150 can be employed.

In the inflator 100 shown in the present embodiment, the gas generating agent 122 is burnt by activation of the igniter 130 and ignition of the booster 132 to generate a combustion gas. The combustion gas flows into the inner space 103 through the communication holes 124 to increase an internal pressure with the pressurized medium and rupture the main rupturable plate 148. Thereafter, the pressurized medium and the generated gas are ejected from a diffuser port 142 to inflate and develop an air bag.

The inflator of the present invention may comprise activation signal-outputting means including an impact sensor, a control unit, and a module case that accommodates the hybrid inflator 100 and the air bag therein, to constitute an air bag apparatus. For example, the hybrid inflator 100 shown in FIG. 1 is connected to the activation signal-outputting means (the impact sensor and the control unit) in the igniter 130 side, and it is connected and fixed to the module case mounted with the air bag by screwing the stud bolt 150.

Regarding the other constituent elements except for the above, the hybrid inflator 100 of the present invention may properly be applied with a modification made generally by a person skilled in the art. Accordingly, the means for rupturing the main rupturable plate 148 may not be the one using a gas pressure, but can be modified to a known mechanical rupturing means such as a type using a sharp projectile or an electric rupturing means such as a type using an igniter for rupturing the rupturable plate.

What is claimed is:

1. An inflator, comprising:
   a cylindrical inflator housing;
   a diffuser assembly attached to an end of the inflator housing, the diffuser assembly being cylindrical in shape and having a plurality of outlet holes formed in a peripheral wall thereof, the diffuser assembly having an end surface defining a through-hole, and a supporting portion projecting inwardly from an inner peripheral surface of the diffuser assembly in a radial direction thereof; and
   a stud bolt having a shaft portion and a flange portion formed at an end of the shaft portion, the stud bolt being provided inside the diffuser assembly such that the shaft portion extends outside the diffuser assembly through the through-hole, and the flange portion is held between the supporting portion and the end surface.

2. An inflator according to claim 1, wherein the flange portion abuts against an inner surface of the end surface.

3. An inflator according to claim 1 or 2, wherein the end surface of the diffuser assembly is formed by crimping a peripheral edge portion of the diffuser assembly inwardly.

4. An inflator according to claim 1 or 2, wherein the flange portion of the stud bolt is provided with a rotation-preventing structure for preventing rotation of the stud bolt.

5. An inflator according to claim 4, wherein the rotation-preventing structure is a notched structure formed on the flange portion of the stud bolt in a radial direction.

6. An inflator according to claim 1, wherein the housing contains a pressurized medium.

7. An air bag apparatus, comprising:
   an inflator;
   an air bag which is inflated by a gas generated due to activation of the inflator; and
   a module case accommodating the inflator and the air bag, wherein the inflator is the inflator according to claim 1.

8. An air bag apparatus according to claim 7,
   wherein the inflator includes a boss member closing one end of the inflator housing, a peripheral edge of the boss member is formed as a flange projecting in a radial direction of the inflator housing, and a rotation-preventing means projecting outwardly in the radial direction is formed on the peripheral edge,
   the module case is formed with an opening into which the inflator is inserted, and a supporting portion which abuts against and supports the rotation-preventing means is provided on a peripheral edge of the opening.

9. An inflator according to claim 1, wherein the inflator housing contains, therein, a gas generating material for inflating an air bag, and an activation assembly for generating an activation gas to activate the gas generating material.

10. An inflator, comprising:
    a cylindrical inflator housing having an elongated shape;
    a diffuser assembly attached to a first end of the inflator housing, the diffuser assembly being cylindrical in shape and having a plurality of outlet holes formed in a peripheral wall thereof, the diffuser assembly having an end surface defining a through-hole, and a supporting portion projecting inwardly from an inner peripheral surface of the diffuser assembly in a radial direction thereof;
    a stud bolt having a shaft portion and a flange portion formed at an end of the shaft portion, the stud bolt being provided inside the diffuser assembly such that the shaft portion extends outside the diffuser assembly through the through-hole, and the flange portion is held between the supporting portion and the end surface; and
    a boss member attached to a second end of the inflator housing, a peripheral edge of the boss member being formed in a shape of a flange projecting outward in a radial direction of the inflator housing, and having rotation-preventing means provided on the peripheral edge.

11. An inflator according to claim 10, wherein the flange portion abuts against an inner surface of the diffuser assembly.

12. An inflator according to claim 10 or 11, wherein the rotation-preventing means provided on the peripheral edge is a protruding portion projecting outwardly in a radial direction.

13. An inflator according to claim 10, wherein the cylindrical inflator housing contains a gas generating material for inflating an air bag and an activation assembly for generating an activation gas to activate the gas generating material.

14. An inflator according to claim 13, wherein the boss member stores an initiator for activating the inflator.

15. An inflator, comprising:

a cylindrical inflator housing having an elongated shape;

a diffuser assembly cylindrical in shape and attached to an end of the inflator housing, the diffuser assembly having a plurality of outlet holes, formed in a peripheral wall thereof, and a supporting portion formed on an inner peripheral surface of the diffuser assembly, the supporting portion projecting inward in the radial direction of the diffuser assembly;

a stud bolt, including a shaft portion having a screw thread and a flange portion provided at an end of the shaft portion, connected to the diffuser assembly, the flange portion abutting against the supporting portion, wherein an end of the diffuser assembly is crimped and the diffuser assembly holds the flange portion of the stud bolt between the supporting portion and the crimped end.

16. An inflator according to claim 15, wherein the shaft portion penetrates the diffuser assembly and projects outwardly along an axial direction of the housing.

17. An inflator according to claim 15, wherein the cylindrical inflator housing contains a gas generating material for inflating an air bag and an activation assembly for generating an activation gas to activate the gas generating material.

\* \* \* \* \*